(12) United States Patent
Fischer et al.

(10) Patent No.: US 6,263,304 B1
(45) Date of Patent: *Jul. 17, 2001

(54) SIMPLIFIED DIGITIZATION OF PC BEEP SIGNAL FOR AUDIO CODEC

(75) Inventors: Jonathan Herman Fischer, Blandon; Donald Raymond Laturell, Upper Macungie, both of PA (US)

(73) Assignee: Agere Systems Guardian Corp., Miami Lakes, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/974,492

(22) Filed: Nov. 19, 1997

(51) Int. Cl.⁷ ..................................................... G06F 9/455

(52) U.S. Cl. ............................................. 703/23; 703/13

(58) Field of Search ............................... 395/500; 710/62; 703/13, 14, 23, 25, 3, 4

(56) References Cited

U.S. PATENT DOCUMENTS

| | | | |
|---|---|---|---|
| 4,074,233 | * 2/1978 | Swain | 340/825.51 |
| 4,209,853 | * 6/1980 | Hyatt | 367/8 |
| 5,815,583 | * 9/1998 | Solomon et al. | 381/77 |
| 5,881,317 | * 3/1999 | Hampsten et al. | 710/62 |

FOREIGN PATENT DOCUMENTS

| | | | |
|---|---|---|---|
| 09026985A | * 7/1995 | (JP) | G06F/17/50 |
| 10081074 | * 10/1999 | (JP) | G06F/17/50 |

OTHER PUBLICATIONS

Analog Devices et al., "Audio Codec '97; Component Specification; Revision 1.03; Sep. 15, 1996"; Sep. 15, 1997.
Sidhu, Sachdev and Hfuda, 'Computer simulation of protective relay designs for evaluating their performance', IEEE 0–7803–3143–5, 1996.*
Audio Codet 97 Chip Specification Rev 2.1 dated 5/212/1998.*
'Analog–to–Digital and Digital–to–Analog cConversion Techniques', Textbook, Hoeschele, copyright 1994.*
'Fundamentals of Logic design', Roth, copyright 1974.*
Audio Codec 97 Chip Specification Rev 2.1 dated May 22, 1998.*
Jung, "IC Converter Cookbook", Sams & Co., ISBN 0–672–21527–6, pp. 321–327, 1978.*
Microsoft Press Computer Dictionary, Second Edition, ISBN 1–55615–597–2, pp. 146, 361–362, 1993.*

* cited by examiner

Primary Examiner—Kevin J. Teska
Assistant Examiner—Lonnie A. Knox
(74) Attorney, Agent, or Firm—William H. Bollman

(57) ABSTRACT

An improvement to split-architecture audio codecs such as those defined by the Audio Codec '97 specification (AC '97) includes a simulated analog-to-digital (A/D) digitization of the PC beep signal from a personal computer (PC). A PC beep simulated A/D digitization circuit simulates the A/D conversion of the PC beep signal. The PC beep simulated A/D digitization circuit eliminates the need for a pre-amplifier, and reduces the design complexity and power consumption otherwise necessary for an A/D converter, by outputting either of two simulated A/D converter values corresponding respectively to a conversion of the HIGH and LOW logic levels of the PC beep signal. The simulated A/D converter output signal from the PC beep simulated digitization circuit is subsequently scaled and summed with the digital signals from other audio sources, and output from the audio codec.

18 Claims, 4 Drawing Sheets

SIMPLIFIED DIGITIZATION OF PC BEEP SIGNAL FOR AUDIO CODEC

BACKGROUND OF THE INVENTION

1. Field of the Invention

This invention relates to circuitry for converting a PC beep signal into a digital signal for use in an audio codec. More particularly, it relates to the simplification of the architecture in an audio codec surrounding the digitization and summation of a PC beep signal with other audio sources.

2. Background of Related Art

Efficient and inexpensive digitization of telephone grade audio has been accomplished for many years by an integrated device known as a "codec." A codec (short for COder-DECoder) is an integrated circuit or other electronic device which combines the circuits needed to convert analog signals to and from Pulse Code Modulation (PCM) digital signals.

Early codecs converted analog signals at an 8 KHz rate into 8-bit PCM for use in telephony. More recently, the efficiency and low cost advantages of codecs have been expanded to convert analog signals at a 48 KHz sampling rate into 16-bit stereo (and even up to 20-bit stereo) for higher quality use beyond that required for telephony. With higher quality audio capability, today's codecs find practical application in consumer stereo equipment including personal computers (PCs), CD players, modems and digital speakers.

Improved signal-to-noise (S/N) ratios have been achieved largely by separating the conventional codec into two individual sub-systems and/or two separate integrated circuits (ICs): a controller sub-system handling primarily the digital interface to a host processor, and an analog sub-system handling primarily the interface to, mixing and conversion of analog signals. This split digital/analog architecture has been documented most recently as the "Audio Codec '97 Component Specification", Revision 1.03, Sep. 15, 1996 ("the AC '97 specification"). The AC '97 specification in its entirety is expressly incorporated herein by reference.

With the development of codecs for these more sophisticated and generalized purposes came the need to not only accommodate many types of audio sources, but also the need to reduce the cost and the power consumption of the audio codec. The AC '97 specification includes a significant amount of flexibility intended to capture a large market by satisfying many consumer-related audio needs. For instance, the conventional AC analog sub-system includes interface capability to accept input from multiple audio sources and to digitally mix the audio signals from those multiple audio sources.

FIG. 4 is a generalized block diagram of a conventional splitarchitecture audio codec conforming to the AC '97 specification. Audio codecs conforming to the AC '97 specification accommodate audio sources from CD players, auxiliary devices such as stereo equipment, and/or PCs. The intention of routing the PC beep signal through the audio mixer of the split-architecture audio codec is to eliminate the requirement for an onboard speaker or piezoelectric device when the audio codec is used in a PC.

As shown in FIG. 4, the audio from a CD player is amplified by a pre-amplifier 400 for volume control, converted into a digital signal by analog-to-digital converter (A/D) 406, and digitally summed with digital signals from other audio sources in digital scaler/summer 412. Likewise, an auxiliary audio source such as a stereo tuner is amplified to the proper level in pre-amplifier 402, converted into a digital signal by A/D 408, and scaled and summed with the digital signals from other audio sources in digital scaler/summer 412. According to the AC '97 specification, a "beep" signal from a PC is amplified by pre-amplifier 404, converted into a digital signal in A/D 410, and summed with the digital signals from other audio sources in digital scaler/summer 412.

The PC beep signal is typically a two-level signal based on logic levels, e.g., 0 and 5 volts, as shown in FIG. 5. In conventional PCs, the PC beep signal drives a piezoelectric transducer or a speaker at selected frequencies to provide informative "beeps" to the user of the PC. When the audio codec is used inside or in conjunction with a PC, it is useful to include the PC beep signal along with other audio signals so that the user can listen to a single audio source, i.e., set of speakers. The frequency of the PC beep is controlled by repetition rate, while its amplitude is controlled by duty cycle. Tone power of the PC beep is adjusted by an adjustment of the duty cycle. The PC beep signal however, is fixed at a logic level, e.g., 0 or 5 volts.

The A/D converter 410 will output only two encoded digital sample values. One digital sample value is output when the PC beep signal is at a logic HIGH level, and another digital sample value is output when the PC beep signal is at a logic LOW level. Thus, the full range of the conventional PC beep pre-amplifier 404 and PC beep A/D converter 410 (FIG. 4) is essentially wasted. As a result, power usage of the PC beep pre-amplifier 404 and PC beep A/D converter 410 is wasted, and the design of the audio codec is unnecessarily complicated.

SUMMARY OF THE INVENTION

In accordance with the principles of the present invention, apparatus and methods to emulate an A/D conversion of an input signal are provided. A simulated A/D digitizer receives an input signal and has an output connected to a digital summer to sum an output of the simulated A/D digitizer with digital signals from at least one other audio source. The simulated A/D digitizer has a first output bit signal when the input signal is at a first level corresponding to a first level of an A/D converter being emulated, and a second output bit signal when the input signal is at a second level corresponding to a ground level of the A/D converter being emulated. In one embodiment a multiplexer selects between first and second pre-set output signals under the control of the input signal.

In the method of digitizing an input signal, a first pre-set output signal corresponding to an emulated digitization of a HIGH level of the input signal, and a second pre-set output signal corresponding to an emulated digitization of a LOW level of the input signal are provided. The first pre-set output signal is selected when the input signal is at the first level, and the second pre-set output signal is selected when the input signal is at the second level.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
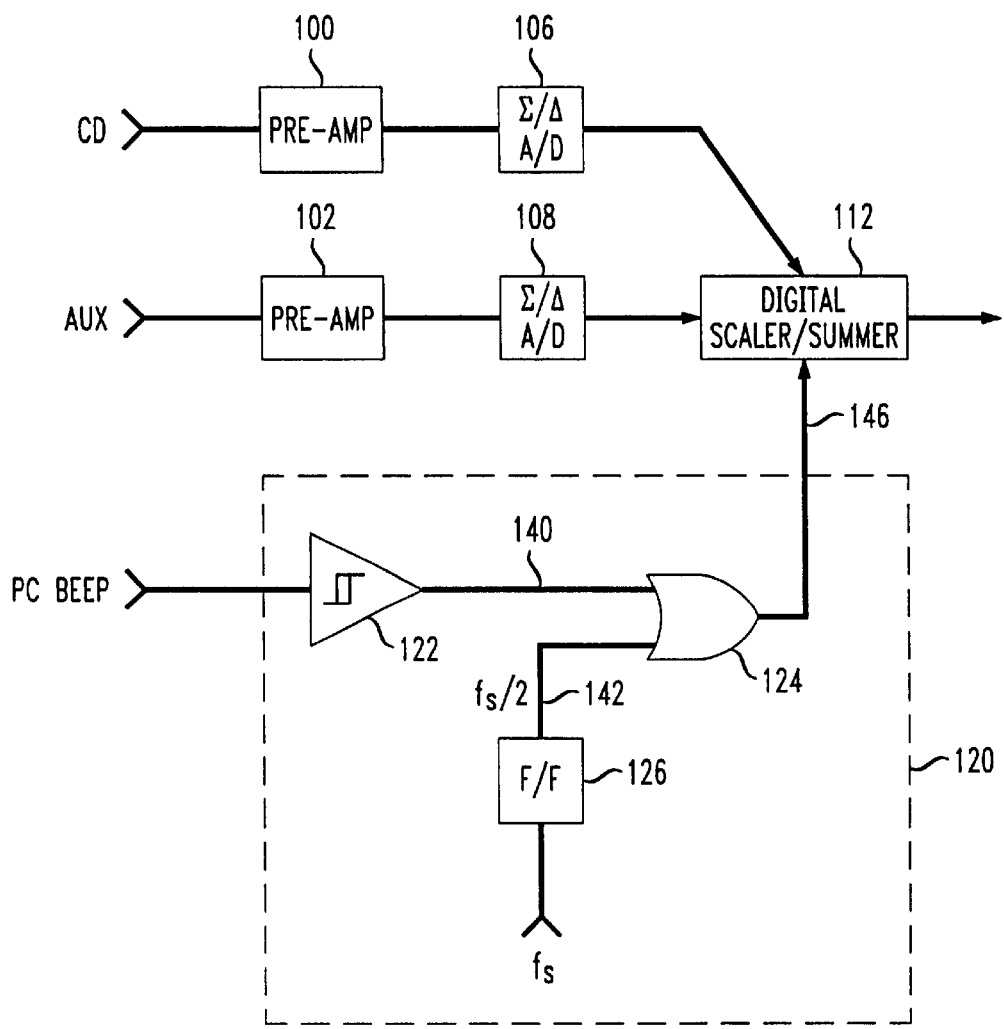
FIG. 1 shows the relevant portions of a first embodiment of a split-architecture audio codec including simulated Σ/Δ digitization of a PC beep signal in accordance with the principles of the present invention.

FIG. 1 shows pertinent features of a split-architecture audio codec system in accordance with the principles of the present invention. Those features not shown are essentially as described in the Audio Codec '97 specification.

FIG. 1 shows three sources of audio in the audio codec: a CD player, an auxiliary source, and a PC beep signal. However, it is to be understood by those of ordinary skill in the art that an audio codec in accordance with the principles of the present invention may accept audio input from many other types of audio sources, e.g., microphones, video, telephone, etc. These other conventional sources are not shown in FIG. 1 to simplify the description of the embodiments of the present invention.

FIG. 1 shows a split-architecture audio codec according to a first embodiment of the present invention. In this embodiment, the audio codec utilizes sigma-delta ($\Sigma/\Delta$) encoding to encode an analog signal into single bit samples. $\Sigma/\Delta$ A/D converters (sometimes referred to as delta-sigma A/D converters) are well known. One advantage of using $\Sigma/\Delta$ A/D converters is to facilitate easy-to-manufacture digital circuitry along with low-precision analog circuitry, allowing for highly integrated A/D converters to be created primarily with digital techniques. One conventional publication describing conventional $\Sigma/\Delta$ A/D converters is "Analog-to-Digital Conversion-A Practical Approach" by Kevin M. Daugherty, McGraw-Hill, Inc. (1994), which is expressly incorporated herein by reference.

In FIG. 1, the audio from a CD player is amplified or volume-controlled by pre-amplifier 100, digitally converted into single bit samples by $\Sigma/\Delta$ A/D converter 106, scaled and summed by digital scaler/summer 112, and output from the audio codec. Similarly, the audio from an auxiliary source is amplified by pre-amplifier 102, digitally converted into single bit samples by $\Sigma/\Delta$ A/D converter 108, and scaled and summed by digital scaler/summer 112 into the output of the audio codec.

The PC beep signal is a two-level quantized signal, and thus is always a full-scale logic signal (either HIGH or LOW) from the PC to the audio codec. Thus, it is determined that the PC beep signal does not necessarily require a pre-amplifier because there is only two-level quantized information in the PC beep signal. The PC beep signal path is simplified in an audio codec according to the principles of the present invention by replacing the conventional PC beep pre-amplifier and A/D converter with digital logic that mimics, emulates or otherwise simulates the A/D idle channel output code (alternating 1/0 pattern for a $\Sigma/\Delta$ A/D converter) when the PC beep signal is at a logic LOW, and a full-scale A/D output when the PC beep signal is at a logic HIGH. The digital scaler/summer 112 then scales this simulated $\Sigma/\Delta$ digital signal just as it does the output bit streams from the A/D converters in the paths of the other audio sources. Thus, the present invention replaces the conventional PC beep pre-amplifier 404 and A/D converter 410 with a simulated $\Sigma/\Delta$ A/D digitization circuit 120 to take advantage of the digital rather than analog nature of the PC beep signal.

The simulated $\Sigma/\Delta$ A/D digitization circuit 120 shown in FIG. 1 includes a Schmidt trigger 122, an OR gate 124, and a flip-flop 126. The Schmidt trigger 122 or similar device is useful to ensure that the PC beep signal is a clean signal based on the logic levels of the audio codec. Although preferable, the Schmidt trigger 112 is not absolutely required.

The sampling frequency $f_s$ is the sampling clock used by the $\Sigma/\Delta$ A/D converters 106, 108 for the other audio sources. Flip-Flop 126 divides the sampling frequency $f_s$, in half, and inputs that fs/2 clock to one input of OR gate 124. The output of Schmidt trigger 122 is input to another input of OR gate 124.

The simulated $\Sigma/\Delta$ A/D digitization circuit 120 simulates output bit samples of a $\Sigma/\Delta$ A/D converter. When the clean PC beep signal output from the Schmidt trigger 122 is at a logic HIGH, OR gate 124 outputs a steady stream of '111111111111' because the input 140 to the OR gate 124 is continuously HIGH. This corresponds to a $\Sigma/\Delta$ A/D converter which is outputting an encoded signal at the upper rail, e.g., 5 volts. This simulated digital upper rail signal is summed together with the digital signals from other audio sources in the digital scaler/summer 112 and ultimately output from the audio codec.

When the clean PC beep signal output from the Schmidt trigger 122 is at a logic LOW, OR gate 124 outputs the equivalent of the $f_s/2$ clock. Thus, OR gate 124 outputs a repeating '010101010101' signal, corresponding to the $\Sigma/\Delta$ digitization of a half scale analog level output of the $\Sigma/\Delta$ A/D converter (e.g. 0 volt). This simulated, $\Sigma/\Delta$ encoded, 0 volt analog signal (in digital form) is summed with the digital signals from other audio sources by the digital scaler/summer 112 and output from the audio codec.

Figure 2:
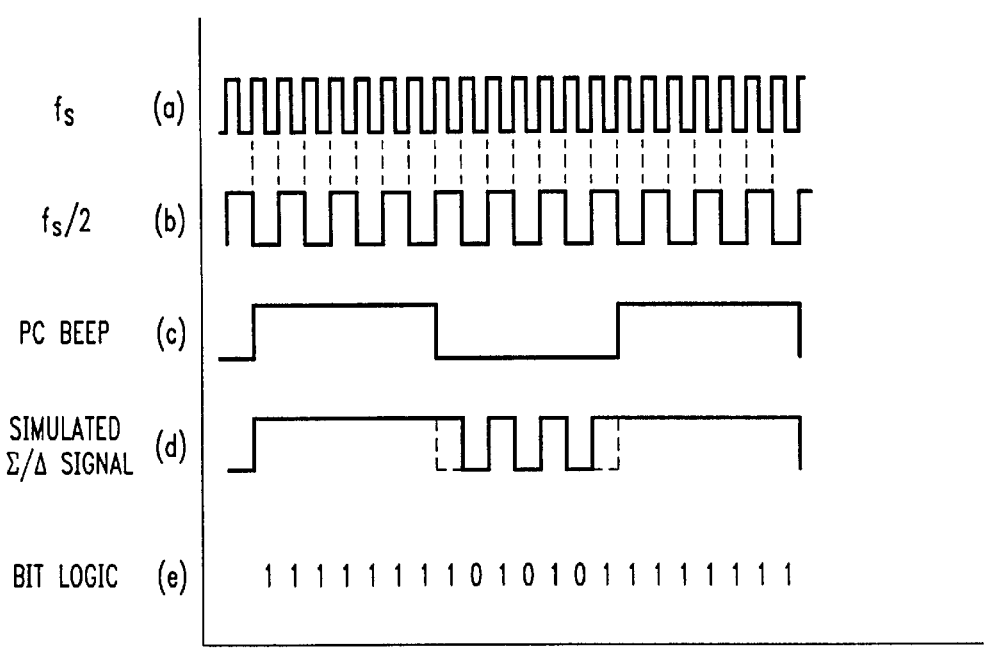
FIG. 2 is a timing diagram for the PC beep simulated Σ/Δ digitizer of the embodiment shown in FIG. 1.

FIG. 2 is a timing diagram showing the timing of the simulated $\Sigma/\Delta$ A/D digitization circuit 120 shown in FIG. 1. Waveform (a) shows the $\Sigma/\Delta$ clock $f_s$, and waveform (b) shows the half $\Sigma/\Delta$ clock $f_s/2$. Waveform (c) depicts the clean PC beep signal output from the Schmidt trigger 122. Waveform (d) shows the output of the simulated $\Sigma/\Delta$ A/D digitization circuit 120. It is seen that when the PC beep signal shown in waveform (c) is at a logic HIGH, the simulated $\Sigma/\Delta$ signal shown in waveform (d) is also at a logic HIGH level. However, when the PC beep signal shown in waveform (c) is at a logic LOW level, the simulated $\Sigma/\Delta$ signal becomes a repeating bit stream of '010101010101' with respect to the $\Sigma/\Delta$ clock $f_s$ shown in waveform (a).

The $\Sigma/\Delta$ clock $f_s$, the half $\Sigma/\Delta$ clock $f_s/2$, and the simulated $\Sigma/\Delta$ signal output from OR gate 124 are synchronous with one another. The PC beep input to the Schmidt trigger 122 is not necessarily synchronous with the $\Sigma/\Delta$ clock $f_s$, the half $\Sigma/\Delta$ clock $f_s/2$, or the simulated $\Sigma/\Delta$ signal output from OR gate 124.

Of course, other types of A/D converters other than $\Sigma/\Delta$ A/D converters may be implemented in an audio codec for audio signals other than the PC beep. Even with these other types of A/D converter audio codecs, the digitization of the PC beep signal can be simulated by logic according to the principles of the present invention rather than by an A/D converter. For instance, FIG. 3 depicts a generalized block diagram of an audio codec using A/D converters for audio signals other than the PC beep, and a simulated output of an A/D converter for the PC beep signal.

Figure 3:
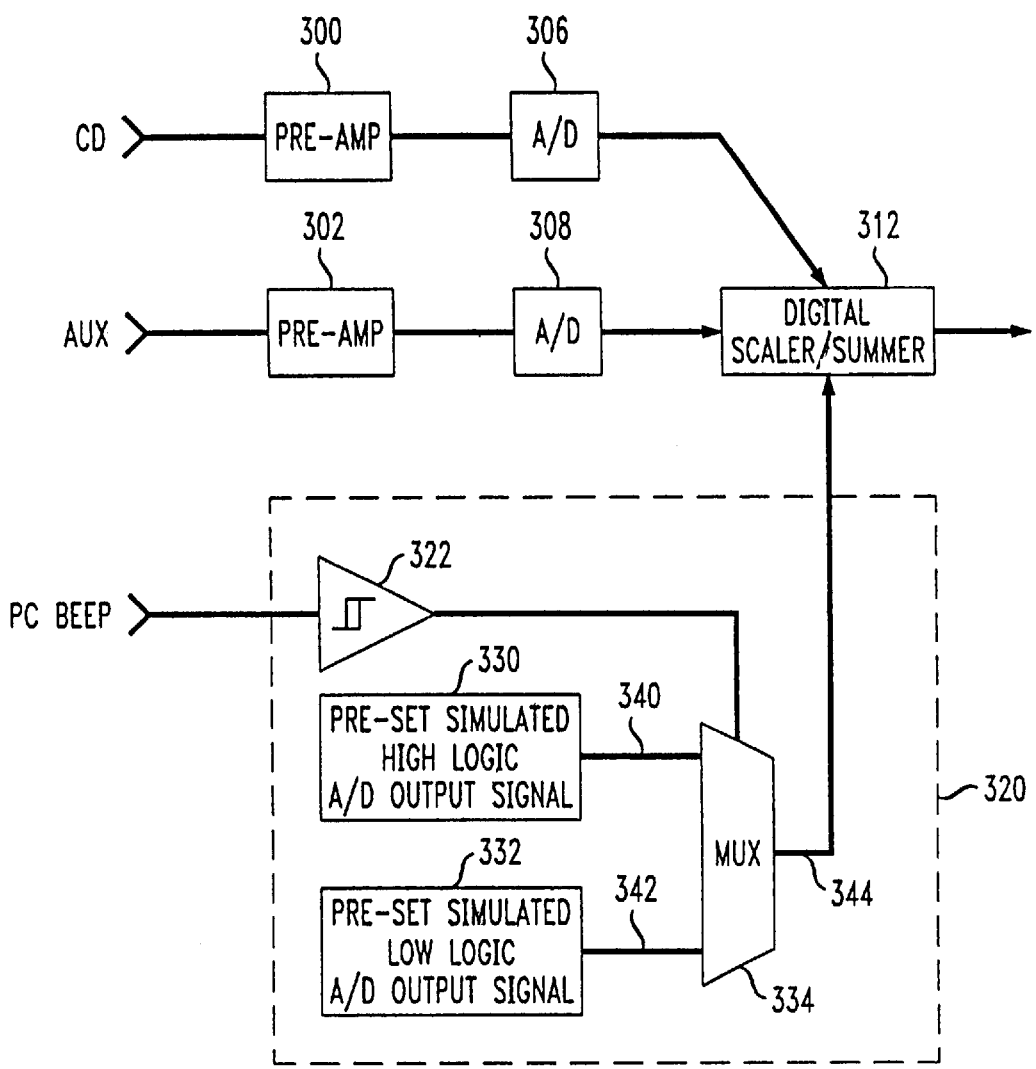
FIG. 3 shows the relevant portions of a second embodiment of a split-architecture audio codec including linear digitization of a PC beep signal in accordance with the principles of the present invention.
Figure 4:
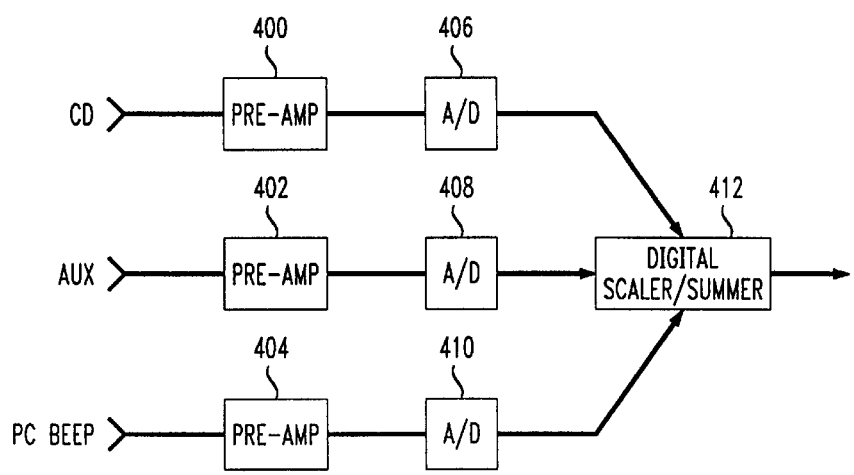
FIG. 4 shows the relevant portions of a conventional split-architecture audio codec using a pre-amplifier and an A/D converter to digitize a PC beep signal.
Figure 5:
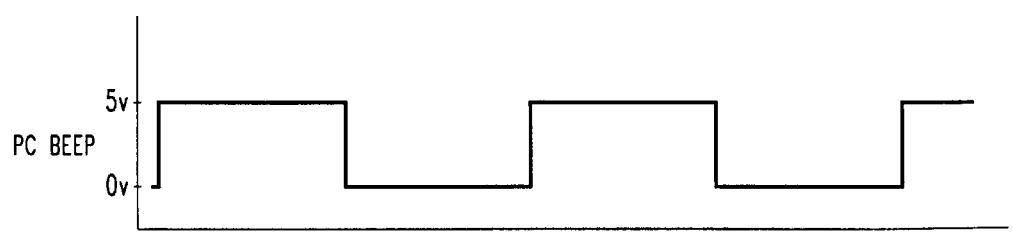
FIG. 5 shows a conventional PC beep signal.

In FIG. 3, an audio signal from a CD player is amplified by pre-amplifier 300, digitized by an A/D converter 306, scaled and summed by digital scaler/summer 312, then output by the audio codec. An auxiliary audio signal is similarly amplified by pre-amplifier 302, digitized by an A/D converter 308, and scaled and summed into the audio codec's output by digital scaler/summer 312. However, in this second embodiment, the digitization of the PC beep signal is simulated by simulated digitization circuit 320.

Simulated digitization circuit 320 includes a Schmidt trigger 322 or other suitable buffering device to provide a clean PC beep signal to the remaining circuitry of the digitization circuit 320. The PC beep signal output from the simulated digitization circuit 320 controls a multiplexer (MUX) 334 to output either the simulated HIGH A/D signal constantly present on input 340 to MUX 334, or the simulated LOW A/D signal constantly present on input 342 to MUX 334.

These respective simulated HIGH and LOW A/D output signals correspond to the digital outputs of an A/D converter using two's-complement binary data of the type comprising A/D converters 306, 308 when its input is at the corresponding logic levels, e.g., 0 volts and 5 volts, respectively. For instance, a simulated logic HIGH A/D output signal from circuit 330 would be a parallel output of '0111111111111111' for a simulated full scale output code from that same 16-bit A/D converter, and a simulated logic LOW A/D output signal from circuit 332 would be a parallel output of '0000000000000000' corresponding to a half-scale (e.g., ground level) for one type of a 16-bit linear A/D converter. Of course, the digital scaler/summer 312 shown in FIG. 3 must be a multi-bit digital scaler/summer.

The MUX 334 outputs the simulated logic HIGH A/D signal on input 340 of MUX 334 when the PC beep signal is at a logic HIGH, and outputs the simulated logic LOW A/D signal on input 342 of MUX 334 when the PC beep signal is at a logic LOW.

It is thus seen that the present invention utilizes simple logic to provide a simulated A/D output signal which preserves the frequency and amplitude information in the PC beep signal and eliminates the otherwise conventional A/D converter and pre-amplifier in the PC beep path.

While the invention has been described with reference to the exemplary preferred embodiments thereof, those of ordinary skill in the art will be able to make various modifications to the described embodiments of the invention without departing from the true spirit and scope of the invention.

We claim:

1. An apparatus to emulate an output of an analog-to-digital converter, comprising:
    an input configured to receive a two-level PC beep input signal from an analog source; and
    an output connected to a digital summer to sum an output signal of said apparatus with digital signals from at least one other analog source;
    wherein said apparatus is configured to output a first output bit signal comprising a first plurality of bits at said output in response to input of a first level of said two-level PC beep input signal at said input, said first output bit signal corresponding to a first digital output of said analog-to-digital converter in response to said first level of said two-level PC beep input signal, and said apparatus is configured to output a second output bit signal comprising a second plurality of bits at said output in response to input of a second level of said two-level PC beep input signal at said input, said second output bit signal corresponding to a second digital output of said analog-to-digital converter in response to said second level of said two-level PC beep input signal.

2. The apparatus according to claim 1, wherein:
    said first plurality of bits is a positive full scale output code of said analog-to-digital converter.

3. The apparatus according to claim 1, wherein:
    said apparatus emulates a linear analog-to-digital converter for said two-level PC beep input signal.

4. The apparatus according to claim 1, wherein:
    said apparatus emulates a $\Sigma/\Delta$ analog-to-digital converter for said two-level PC beep input signal.

5. The apparatus according to claim 4, wherein:
    said first plurality of bits is a substantially constant stream of '1's with respect to an analog-to-digital converter clock.

6. The apparatus according to claim 4, wherein:
    said second plurality of bits is a pattern having a substantially 50% duty cycle.

7. The apparatus according to claim 6, wherein:
    said pattern having a substantially 50% duty cycle is a substantially repeating pattern of '01' with respect to another analog-to-digital converter clock.

8. The apparatus according to claim 1, wherein said apparatus comprises:
    a flip-flip for providing a divided analog-to-digital converter clock signal;
    an OR gate;
    said OR gate receiving as a first input signal a representation of said two-level PC beep input signal;
    said OR gate receiving as a second input signal said divided analog-to-digital converter clock signal; and
    said OR gate outputting said output signal at said output.

9. The apparatus according to claim 8, wherein:
    said divided analog-to-digital converter clock signal is an analog-to-digital converter clock signal divided by two.

10. The apparatus according to claim 1, wherein:
    said apparatus is comprised within a split-architecture audio codec.

11. The apparatus according to claim 1, further comprising:
    a digital summer summing said digital output signal with digital signals converted from at least one other analog source.

12. An apparatus to emulate an output of an analog-to-digital converter, said apparatus outputting a first digital output signal and a second digital output signal in response to a first level of a two-level PC beep analog input signal and a second level of said two-level PC beep analog input signal, respectively, said apparatus comprising:
    an input configured to receive said two-level PC beep analog input signal;
    a first pre-set output signal corresponding to said first digital output signal;
    a second pre-set output signal corresponding to said second digital output signal; and
    a multiplexer configured to output said first pre-set output signal in response to said first level of said two-level PC beep analog input signal at said input, and to output said second pre-set output signal in response to said second level of said two-level PC beep analog input signal at said input.

13. The apparatus according to claim 12, further comprising:
    a Schmidt trigger configured to buffer said two-level PC beep analog input signal.

14. The apparatus according to claim 12, wherein:

said apparatus emulates an output of a $\Sigma/\Delta$ analog-to-digital converter for said two-level PC beep analog input signal.

15. An apparatus to emulate an output of an analog-to-digital converter digitizing a two-level PC beep analog input signal from an audio source, said apparatus outputting a first digital output signal and a second digital output signal in response to a first level of said two-level PC beep analog input signal and a second level of said two-level PC beep analog input signal, respectively, said apparatus comprising:

means for providing an input to receive said two-level PC beep analog input signal;

means for providing a first pre-set output bit signal corresponding to said first digital output;

means for providing a second pre-set output bit signal corresponding to said second digital output;

means for providing an output; and means for selecting said first pre-set signal at said output in response to said first level of said two-level PC beep analog input signal at said input, and for selecting said second pre-set output signal at said output in response to said second level of said two-level PC beep analog input signal at said input.

16. The apparatus according to claim 15, further comprising:

means for digitally summing said emulated analog-to-digital output signal with analog-to-digital conversion signals of at least two other audio sources.

17. A method to emulate an output of an analog-to-digital converter digitizing a two-level PC beep analog input signal, said analog-to-digital converter outputting a first digital output signal and a second digital output signal in response to a HIGH level of said two-level PC beep analog input signal and a LOW level of said two-level PC beep analog input signal, respectively, said method comprising:

providing a first pre-set output signal corresponding to said first digital output signal;

providing a second pre-set output signal corresponding to said second digital output signal;

selecting said first pre-set output signal as an emulated analog-to-digital output of said two-level PC beep analog input signal in response to said HIGH level of said two-level PC beep analog input signal; and selecting said second pre-set output signal as said emulated analog-to-digital output of said two-level PC beep analog input signal in response to said LOW level of said two-level PC beep analog input signal.

18. The method according to claim 17, further comprising:

summing said emulated analog-to-digital output signal with analog-to-digital conversion signals of at least one other analog source.

* * * * *